W. T. BONNER.
BRAKE.
APPLICATION FILED FEB. 11, 1920.

1,426,543.

Patented Aug. 22, 1922.

Inventor
William T. Bonner
By Clyde L. Rogers
his Atty.

UNITED STATES PATENT OFFICE.

WILLIAM T. BONNER, OF TRENTON, NEW JERSEY, ASSIGNOR TO MAX BROWN, OF BOSTON, MASSACHUSETTS.

BRAKE.

1,426,543.  Specification of Letters Patent.  Patented Aug. 22, 1922.

Application filed February 11, 1920. Serial No. 357,780.

*To all whom it may concern:*

Be it known that I, WILLIAM T. BONNER, a citizen of the United States, and resident of Trenton, county of Mercer, State of New Jersey, have invented an Improvement in Brakes, of which the following description, in connection with the accompanying drawings, is a specification, like characters on the drawings representing like parts in each of the several views.

This invention relates to braking mechanism adapted to use in machines, stationary or motive, in which the prevention of undue heating of the braking mechanism is to be avoided, such as hoisting engines, motor vehicles, etc. In such constructions the braking mechanism comprises a rotative friction element and a contacting shoe or band, and commonly both of those contacting friction elements are faced with a more or less resilient material to cause a somewhat graduated application of braking action, thus preventing jamming of the braking mechanism and undue shocks to the machine. A great desideratum in such facing materials is the quality of resistance to heat generated by friction, or thermal non-conductivity in the highest degree attainable; and this desideratum has been largely attained by the use of asbestos fabrics, treated with rubber compounds, oils, etc., which act as a binder for the strands and laminæ of asbestos and prevent their ready rupture and dissipation or loss when they are exposed to violent friction. Despite the advance in the art of making such asbestos facings frequent and prolonged braking action causes the resultant heat to penetrate them sufficiently to soften the binding material at the frictional surface, with the result that the fibres of asbestos become loosened and are removed from the brake band of the shoe. This is particularly the case when, as in motor vehicles, brake drums are attached to the driving wheels, and in such vehicles designed for heavy service, to the jack or propeller shafts also. Heretofore the facings having low thermal conductivity have been attached to the brake shoes and brake bands, with the result that when high duty is required of the braking mechanism, as in driving in hilly country, the brake drums become so heated as to cause comparatively rapid and serious deterioration of the said facings.

The object of my invention is to reduce substantially the intensity of the frictional heat generated in every part of the friction facing without reducing the efficiency of the braking mechanism; and this object I attain by transferring the friction facing from the brake band and brake shoe to the rotative braking element, thus securing a greater expanse of friction facing throughout which the same amount of frictional heat is generated, resulting in a substantial reduction of intensity of said heat in every part of the friction facing. This beneficial result is obtained when, as in the use of brake drums fixed upon the jack or the propeller shaft, a brake band or strap only is used as a contracting friction element. When, however, as in the common construction of motor vehicles of all kinds, the brake drums attached to the driving wheels of the vehicles, are provided with service and emergency braking mechanisms which comprise a shoe within the drum and a band or strap adapted to be contracted upon the periphery of the drum, the advantage gained by facing the drum exteriorly and interiorly with material of low thermal conductivity is very great. In driving such vehicles in hilly country it often becomes necessary to use the shoe within the drum and the band or strap as well with braking effect, whereupon the drum becomes greatly heated, with resultant injury to the friction facings on the shoe and strap; and such injury is only slightly, if at all, lessened by the alternate use of the shoe and the strap, as the intermediate wall of the drum is kept in highly heated condition by the application of strong friction to the inside and the outside of its wall alternately. By covering both the internal and external sides of the circular wall of the drum with such friction facings the frictional heat is prevented from appreciably heating the metal of the drum, while the brake shoe and strap being of metal and in no part covered by the non-conductive material, the heat generated in them is rapidly dissipated through them as mediums of conducivity.

A further advantage of my construction resides in the fact that renewal of the friction facings is rendered much more convenient because of the ready access to the drums. The foregoing and other objects and advantages of the invention will more fully appear from the following detailed description;

and the distinctive features of the invention will be pointed out in the appended claims.

Referring to the drawings.

Figure 1:
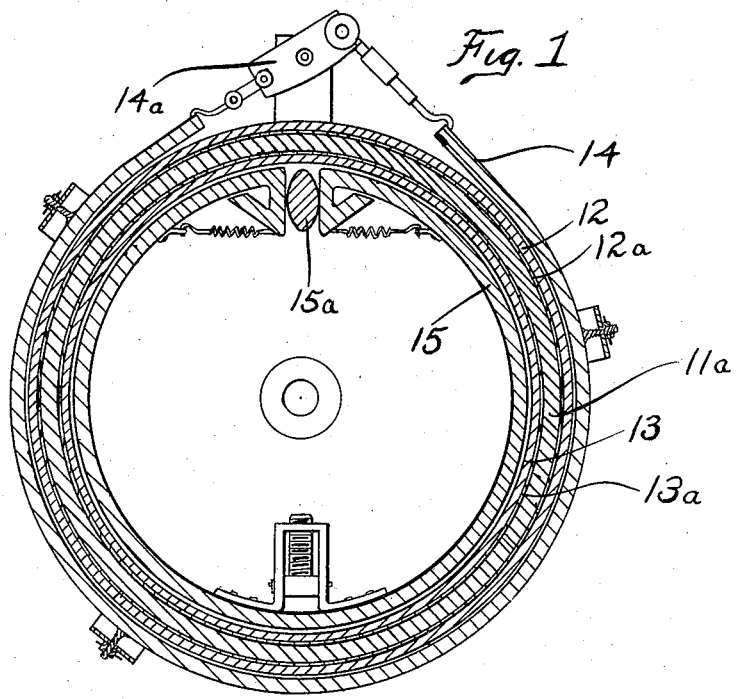
Fig. 1 is a transverse section through a brake constructed in accordance with my invention, this section being taken on line 1—1 of Fig. 2.
Figure 3:
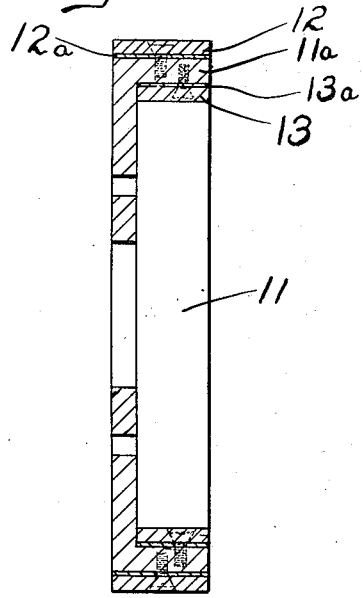
Figure 2:
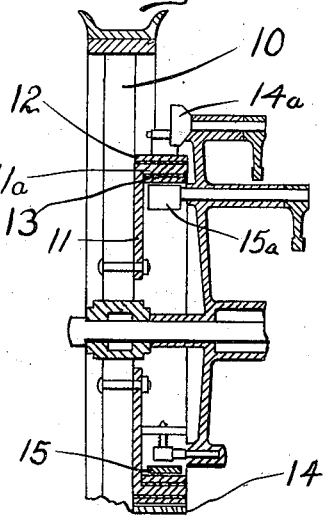
Fig. 2 is a longitudinal section showing a portion of a rear wheel equipped with the brake of my invention; and, Fig. 3 is a diametrical section of the brake drum of my invention detached.

10 indicates the rear wheel of an automobile having secured thereto a metallic brake drum 11 which may be of the usual flanged ring form. In accordance with my invention the operative flange 11ª of the drum has secured to the outer surface thereof a friction facing 12 while the inner surface of the drum flange has fixed thereto a friction facing 13. These facings may be of any suitable material and for this purpose a moldable and vulcanizable asbestos composition or other friction forming substances, molded and vulcanized to the required shape may be employed. This friction facing may be secured to the drum in any suitable manner, but for illustrative purposes I show the same molded and vulcanized in assembled relation with an inner reinforcing sheet or strip of metal indicated at 12ª, 13ª respectively, through which metal strip securing bolts and rivets may be passed for securely clamping the facing to the brake drum. The outer friction facing 12 is engaged by a brake band or strap 14 which may be mounted and operated in the usual manner, a conventional operating device therefor being indicated at 14ª. The inner friction facing 13 of the drum is engaged by an expanding brake shoe 15 which may likewise be of usual type and having a suitable actuator 15ª. Both the brake band 14 and the brake shoe 15 may be, and preferably are, entirely of metal, and being of no great thickness, the heat generated by the braking action is quickly and readily dissipated therefrom while the brake drum 11 is protected and insulated from excessive heat effects by the friction facing of low heat conductivity at each side thereof. In view of the fact that the brake drum or rotative braking member itself may be made of a material having low thermal conductivity, it will be understood that I do not confine my claims to braking mechanism necessarily comprising a facing of low thermal conductivity, but that those of my claims which do not specifically cover a separate facing attached to a braking element are to be understood to comprise a rotative braking element which is itself of low heat conductivity. While the invention is herein shown as applied to an ordinary type of flanged brake drum, this is to be understood as merely an illustrative form of the invention which may assume various modifications and embodiments according to requirements of particular brake constructions. I therefore desire the present embodiment to be considered in all respects as illustrative and not restrictive, reference being had to the appended claims rather than to the foregoing description to indicate the scope of the invention.

Having described my invention what I claim as new and desire to secure by Letters Patent is:

1. Braking apparatus, comprising a rotative braking element having an exterior face and an interior face of relatively low thermal conductivity and means adapted to be forced into and out of frictional contact with said faces of said rotative element.

2. Braking apparatus, comprising a brake drum having friction facings of relatively low heat conductivity fixed to the inner and outer surfaces thereof, with a brake band engaging the outer braking surface, and a brake shoe engaging the inner braking surface thereof.

3. Braking apparatus, comprising a brake drum having friction facings applied to both the inner and outer surfaces thereof, and relatively stationary metallic brake members mounted to engage said surfaces selectively.

4. Braking apparatus, comprising a flanged brake drum equipped with friction facings upon both the inner and outer faces thereof, a metallic brake strap mounted for application to said outer facing, and a metallic brake shoe mounted for application to said inner facing.

5. Braking apparatus, comprising a flanged brake drum having friction facings of moldable and vulcanizable asbestos composition applied to the inner and outer faces thereof, a metallic brake band mounted to engage said outer facing, and a metallic brake shoe mounted to engage said inner facing.

In testimony whereof, I have signed my name to this specification.

WILLIAM T. BONNER.